2,861,947

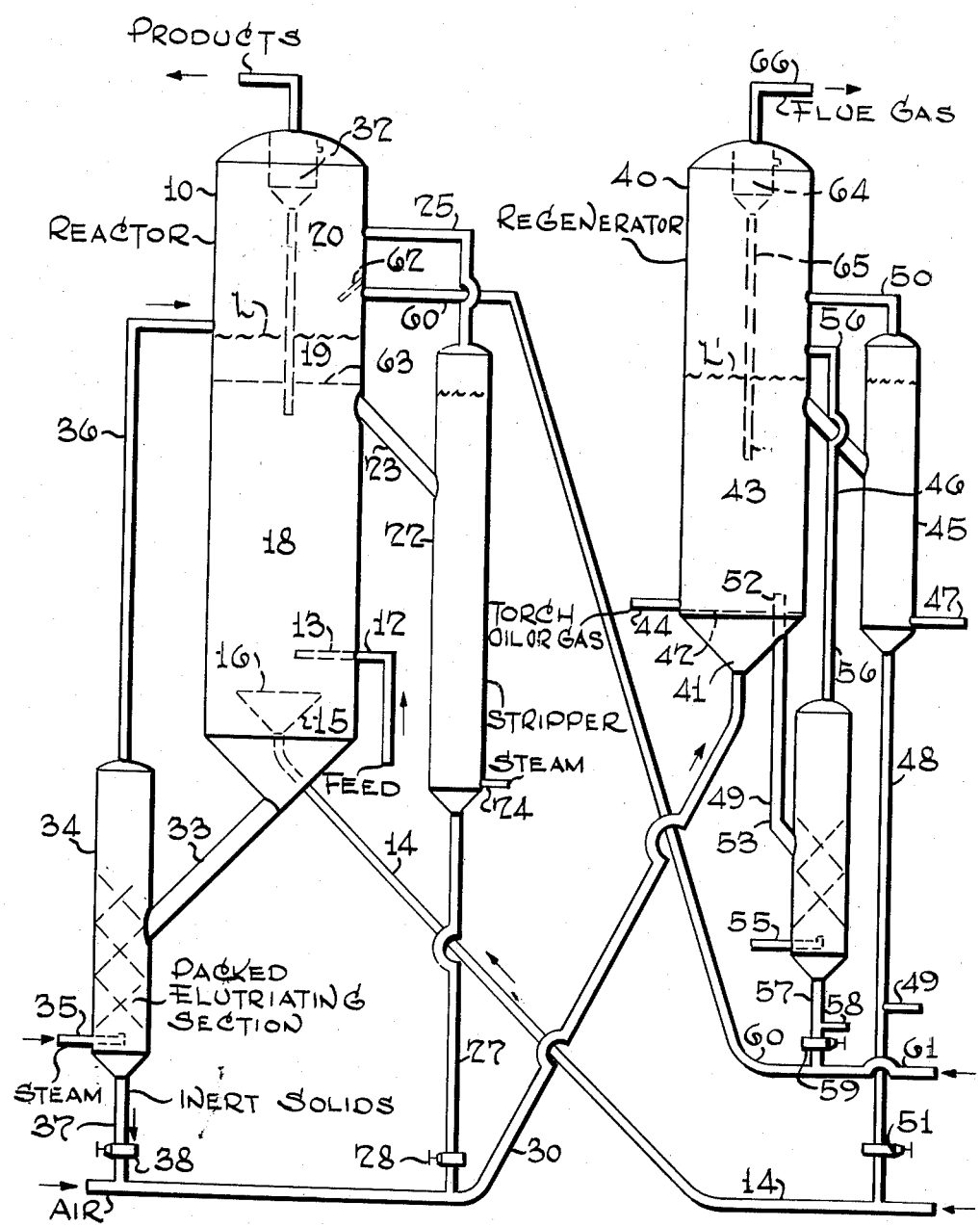

FLUID HYDROFORMING WITH INVERSE TEMPERATURE GRADIENT

Edward W. S. Nicholson, Baton Rouge, La., assignor to Esso Research and Engineering Company, a corporation of Delaware Application December 26, 1951, Serial No. 263,447

4 Claims. (Cl. 208—149)

This invention pertains to the catalytic conversion of hydrocarbon fractions and particularly to the conversion of hydrocarbon fractions boiling within the motor fuel boiling range of low knock rating into high octane number motor fuels. Specifically, this invention pertains to an improved process for upgrading hydrocarbon fractions boiling within the motor fuel or naphtha range by hydroforming or aromatizing the same in a fluidized solids reactor system.

Hydroforming is a well known and widely used process for treating hydrocarbon fractions boiling within the motor fuel or naphtha range to upgrade the same or increase the aromaticity and improve the anti-knock characteristics of said fractions. By hydroforming is ordinarily meant an operation conducted at elevated temperatures and pressures in the presence of solid catalyst particles and hydrogen whereby the hydrocarbon fraction is increased in aromaticity and in which operation there is no net consumption of hydrogen. Hydroforming operations are usually carried out in the presence of hydrogen at temperatures of 750°–1150° F. in the pressure range of about 50–1000 lbs. per sq. inch and in contact with such catalyst as molybdenum oxide or chromium oxide, or, in general, oxides and sulfides of metals of groups IV, V, VI, VII, and VIII of the periodic system of elements, alone, or generally supported on a base or spacing agent such as alumina gel, precipitated alumina or zinc aluminate spinel. Aromatization is carried out in the presence or absence of hydrogen in the presence of the same general class of catalysts at temperatures of about 750°– 1150° F., but at pressures of from atmospheric to at most about 100 lbs. per sq. inch.

It has been proposed in application Serial No. 188,236, filed October 3, 1950, now U. S. Patent No. 2,689,823, to effect the hydroforming of naphtha fractions in a fluidized solids reactor system in which naphtha vapors are passed continuously through a dense, fluidized bed of hydroforming catalyst particles in a reaction zone, spent catalyst being continuously withdrawn from the dense bed and passed to a separate regeneration zone where inactivating carbonaceous deposits are removed whereupon the regenerated catalyst particles are returned to the main reactor vessel. In the process disclosed in said application, operation has been limited to low catalyst to oil ratios (around 1:1) by selectivity considerations since higher ratios resulted in excessive carbon formation. Moreover, high regeneration temperatures have not been possible due to steam deactivation of the catalyst. These factors limit the transfer of heat from the regenerator to the reactor via the catalyst and make it necessary to provide cooling coils in the regenerator and to provide furnaces or other means for supplying heat to the reactor either directly or indirectly through preheating the reactants and/or the hydrogen-rich recycle gas. It has been proposed in application Serial No. 219,217, filed April 4, 1951, now U. S. Patent No. 2,721,167, to overcome some of these shortcomings particularly as to heat balance between the reactor and regenerator by circulating a stream of inert solids in addition to the circulating catalyst stream. In this way, heat released in the regenerator can be transferred as sensible heat of the inert solids to the reactor thereby obviating or minimizing the necessity for supplying heat of reaction through catalyst circulation and/or preheat of the feed and recycle gas. Under these circumstances, the catalyst circulation rate can be independently controlled to any desired low value and high temperature preheating of the recycle gas and naphtha feed streams is unnecessary.

It is the object of this invention to provide a process whereby hydrocarbon fractions boiling within the motor fuel range may be hydroformed or aromatized in an advantageous manner by the fluidized solids technique in a system in which substantial quantities of inert solids are circulated in addition to the circulating catalyst stream.

It is a further object of this invention to provide a process whereby hydrocarbon fractions boiling within the motor fuel range may be hydroformed or aromatized in a fluidized solids reactor system in which all the heat released in the regeneration of the catalyst particles may be readily transferred from the regeneration vessel to the reaction vessel.

It is also an object of this invention to provide a process whereby hydrocarbon fractions boiling within the motor fuel range may be hydroformed or aromatized by the fluidized solids technique with low catalyst to oil ratios but at high temperatures and without excessive preheating of the naphtha feed and without the circulation of excessive amounts of recycle gas and without heating the recycle gas to excessively high temperatures.

It is a further object of this invention to devise a simple and economical method for transferring the heat of regeneration to the reactor vessel and simultaneously protecting the catalyst from excessively high or inactivating temperatures.

It is also the object of this invention to provide a simple, effective method for providing an inverse temperature gradient in a fluidized solids reactor vessel.

It is also a further object of this invention to provide a simple, effective method for providing an inverse temperature gradient in a fluidized solids reactor vessel while still maintaining essentially concurrent flow of catalyst and oil through the reactor.

These and other objects will appear more clearly from the detailed specification and claims which follow.

It has now been found that the hydroforming or aromatization of petroleum fractions boiling within the motor fuel boiling range in a fluidized solids reactor system can be carried out to greater advantage if extraneous heat-carrying or heat transfer solids are circulated between the reactor vessel and the regeneration vessel in a particular manner. It is, of course, old to use so-called pebble heaters to heat up an extraneous heat-carrying solid for circulation through a reaction zone in order to convey some or all of the heat required for carrying out the desired reaction or operation into the reaction zone. In accordance with the present invention a circulating stream of inert fluidized solids is provided to carry the necessary heat from the regenerator to the reactor, thus making it possible to operate with as low a circulation rate of catalyst as desired, thus reducing carbon formation and also oxygen as well as hydrogen requirements. The hot inert solids stream is discharged into the top of the reactor dense bed which may be provided with baffles, perforated plates with downcomers or other devices to prevent top-to-bottom mixing of the catalyst and thereby maintain the inverse temperature gradient. The relative rates of circulation of catalyst and inert heat transfer solids are controlled by separate slide valves on individual standpipes through which the two solids streams are withdrawn from the reactor and the regenerator. The stream of inert solids is discharged from the reactor into the stream of regeneration air for transport to the regenerator upstream of the point of addition of the spent catalyst so that the heat absorptive capacity of the inert solids will preclude overheating the catalyst through combustion of the carbonaceous deposits thereon during its travel through the transfer line into the regenerator vessel. Extraneous heat may be added, if desired, to the circulating solids stream by introducing a combustible oil or gas directly into the regenerator. The regenerated catalyst particles in admixture with a small amount of inert heat transfer solids are discharged from the regenerator via a standpipe, or the like, into a stream of recycle gas which carries the mixture back to the reactor. Because of the great flexibility possible in the amount of heat provided by the circulating inert solids, it is not necessary to preheat the feed to temperatures that might result in thermal degradation of feed. In fact, it is possible to eliminate entirely the feed preheat furnace and to heat the feed stream only to the temperatures possible by heat exchange with product streams. Further, it is not necessary to circulate such large volumes of recycle gas and it is not necessary to heat the recycle gas to the high temperatures of about 1200° F. that are normally required. This eliminates or minimizes the possibility of coking in the recycle gas fired coil. Moreover, it is possible with this arrangement to operate with recycle gas temperatures of 1000° F. or less, which permits using carbon steel furnace tubes in place of the more expensive alloy tubes required for the high recycle gas temperatures previously necessary. By introducing the hot inert solids stream into the top of the dense reactor bed, an inverse temperature gradient is established whereby the reaction mixture contacts catalyst in a final conversion stage or zone where the temperature is somewhat above the average for the entire reaction zone.

Reference is made to the accompanying drawing illustrating a diagrammatic flow plan of the process in accordance with the present invention.

In the drawing, 10 is the reactor vessel and 40 is the regenerator vessel in the fluidized solids reactor system. Fresh feed or charging stock, which may be a virgin naphtha, cracked naphtha, Fischer-Tropsch naphtha or the like having a boiling range of from about 130°–430° F., is supplied under pressure and preheated to a desired temperature through line 12 to suitable distributor nozzles 13 in the lower portion of the reactor vessel 10. Catalyst mixed with a small amount of inert heat transfer solids is supplied to the reactor vessel 10 in finely divided condition in suspension in a hydrogen-containing gas, preferably recycle hydrogen-rich process gas through inlet line 14 which discharges into inlet cone 15 in the lower portion of the reactor vessel. Solid particles and carrying gas are discharged from the inlet cone through a perforated plate or grid 16 which serves to distribute the incoming material uniformly over the entire cross section of the reactor vessel. A stream of hot inert solids containing a small amount of catalyst particles is discharged in through line 60 against baffle 62 in the upper part of the reactor vessel 10 from where the solid particles drop into the upper part of the reactor dense bed. Means such as one or more perforated grids 63 or plates and downcomers are preferably provided to prevent rapid dispersal of the solids supplied to the top of the bed down into the main fluidized body of solids in the reactor.

The inert, heat transfer solids are preferably coarser and/or of greater density than the catalyst used in the process. Typical solids which may be used are metal spheres or ceramic balls or granules such as corundum or gamma alumina, fused silica or the like. It is necessary that these materials have no adverse effects upon the catalytic reactions occuring in the reactor and that they be stable or resistant to breakdown due to the temperature and mechanical action to which they are subjected. Unless the inert heat transfer solids are relatively heavy or have a bulk density at least 1.5 times the bulk density of the catalyst, they should be no smaller than about 100 microns and should preferably be in the range of 125–300 microns.

The feed or charging stock vapors introduced via nozzles 13 and the hydrogen-containing gas supplied through inlet chamber 15 and distributor grid 16 pass through the reaction zone at a superficial velocity of about 0.2 to 0.9 ft. per second at reactor conditions depending upon the pressure. For example, the velocity should be below 0.6 ft. per second in the pressure range of 200–250 lbs. per sq. inch gauge. The velocity should be sufficient to maintain a dense turbulent, liquid-simulating bed 18 of catalyst and inert solid particles and gas with a zone or region 19 at the top of the bed having a temperature above the average temperature of the main bed 18. The dense fluidized bed of solid particles suspended or dispersed in gas has a definite level L with a dilute phase suspension of solids and product vapors 20 thereabove.

A vertical conduit 22 is arranged alongside the reactor vessel 10 for receiving catalyst directly from the dense, fluidized bed 18 through connector pipe 23. An inlet 24 for the introduction of steam or other stripping gas is provided in the lower part of conduit 22 in order to displace, strip off or desorb hydrogen and/or hydrocarbons accompanying the catalyst particles withdrawn from the dense bed 18. The line 25 connecting the top of conduit 22 with the upper part of reactor 10 serves to conduct stripping gas and stripped vapors into the dilute phase in the reactor for admixture with product vapors. While the conduit or stripper 22 is shown arranged externally of the reactor vessel, it will be understood that it could also be arranged within the vessel itself in which event the conduit would be open at the top and extend into the dilute phase 20 and one or more restriction orifices would be provided in the wall of the conduit below the dense bed level 19 to permit passage of catalyst from the dense bed into the conduit 22.

Since the catalyst and hydrocarbon feed are introduced near the bottom of reactor 10 and product vapors are removed overhead and catalyst is removed near the top of the dense catalyst bed, there is a general concurrent flow of hydrocarbon vapors and catalyst in the reactor vessel 10. It is desirable to arrange the connector 23 in the upper portion of the bed to obtain maximum concurrent flow of catalyst and oil vapors up through the bed 18 and to obtain a minimum of short-circuiting or passage of catalyst into connector 23 and conduit 22 immediately after it enters the dense bed 18. The connector 23 should be sufficiently below the maximum bed level to take care of any normal fluctuations in the depth of the dense bed. More than one connector 23 may be provided at different levels and each connector may be provided with means to control the flow of catalyst into conduit 22. The lower end of conduit 22 is necked down and connects to conduit 27 to form therewith a standpipe for developing a fluistatic pressure sufficient to cause the catalyst to flow through a control or slide valve 28 into transfer line 30 and thence into the regenerator 40.

The vaporous reaction products must pass through the zone 19 of higher temperature than the average temperature in bed or zone 18 whereby more refractory constituents of the reaction mixture are converted or hydroformed thereby giving better product distribution and superior properties in the final product.

The vaporous reaction products discharged overhead from the dense bed as well as the stripping gases discharged from the conduit 22 pass through a cyclone separator 32 or the like which serves to remove small amounts of catalyst that are entrained in the gaseous products. The separated catalyst particles are returned to the dense bed by the dip pipe shown and the vaporous products substantially free of catalyst are taken overhead through the products outlet line and passed to suitable recovery or processing equipment.

The inert, heat transfer solid particles are withdrawn from the bottom of the reactor vessel through a passageway surrounding the inlet chamber 15 and pass in admixture with finely divided catalyst particles through line 33 into chamber 34. Suitable non-fluidizable packing such as Raschig rings, Berl saddles or the like is arranged in the lower part of chamber 34 and an inlet 35 is provided at the base of the chamber for introducing steam or other inert gas for elutriating or effecting separation of finely divided catalyst particles from the inert, heat transfer solids. The finely divided catalyst particles supported in the stream of elutriating gas pass into the upper part of the chamber 34 and thence via line 36 into the upper part of reactor vessel 10. Because of the decrease in gas velocity when this stream enters the reaction vessel most of the catalyst particles drop back into the dense bed 18 while the elutriating gas mixes with the reaction product vapors and stripping gas and stripped out vapors for passage through the cyclone separators for separation of entrained catalyst particles and thence to product recovery equipment.

The inert heat transfer solid particles admixed with a small amount of catalyst particles are discharged from the bottom of chamber 34 into conduit 37 which serves as a standpipe for building up a fluistatic pressure in the heat transfer particles sufficient to cause them to flow through a slide valve or control valve 38 into conduit 30 where they are picked up by a stream of regeneration air and conveyed into the regenerator 40.

The point of introduction of the inert heat transfer solids into the transfer line 30 is upstream from the point of introduction of the main stream of spent catalyst particles. In this way, substantial amounts of inert heat transfer solids are intimately mixed with the spent catalyst particles as soon as they come into contact with the regeneration air. Since the rate of burning of hydrogen adsorbed upon the catalyst as well as of the carbonaceous deposits in contact with the particular catalyst components used is extremely high, the inert heat transfer solid particles serve to adsorb much of the heat of regeneration and thereby prevent overheating of the catalyst as would invariably occur if the spent catalyst was passed alone with the regeneration air through the transfer line into the regenerator.

The mixture of catalyst, inert heat transfer solids and regeneration gas is discharged from transfer line 30 into inlet chamber 41 at the bottom of regenerator 40. A perforated distributor plate or grid 42 covers the top of the inlet chamber and serves to distribute the incoming mixture uniformly over the entire cross section of the regenerator. The velocity of the gases passing through regenerator 40 is so controlled that a dense, highly turbulent fluidized bed of catalyst and inert heat transfer solids 43 having a definite level L' is formed in the regenerator. The superficial velocity of the regeneration gas through the regenerator may range from 0.3 to 1.5 feet per second depending upon the pressure. For example, at regeneration pressures of about 200–300 lbs. per sq. inch the superficial velocity should be about 1.0 ft. per second or lower.

In the event that the reforming operation in reactor 10 does not form sufficient carbon to maintain heat balance in the system, torch oil or gas may be supplied to a nozzle 44 to heat the mixture of catalyst and heat transfer solids to the desired temperature.

A vertical conduit 45 is arranged alongside the regenerator vessel 40 for receiving catalyst directly from the dense fluidized bed 43 through connector pipe 46. An inlet 47 for the introduction of air or inert stripping gas is provided in the lower part of conduit 45 in order to strip off combustion gases. Air is particularly suitable since it serves to effect a final cleanup of carbonaceous deposits upon the solids. It is desirable if not essential to purge the stream of stripped regenerated solid particles discharged from stripper 45 into standpipe 48 of any residual oxygen or carbon oxides by introducing a small amount of nitrogen or other inert gas through inlet line 49. Stripping and purging gases are taken overhead from stripper 45 and discharged through line 50 into the dilute phase in the upper part of regenerator 40. The stripped regenerated catalyst mixed with some inert heat transfer solids is discharged from standpipe 48 through slide valve 51 or the like into transfer line 14 where it is picked up by a stream of recycle gas and conveyed into the inlet cone or chamber 15 in the lower part of the reactor.

A mixture of inert heat transfer solids and catalyst particles is withdrawn from dense bed 43 into well 52, thence through conduit 53 into elutriating chamber 54 which is similar in structure and operation to the elutriating section or chamber 34 connected to the reactor vessel. Suitable non-fluidizable packing such as Raschig rings, Berl saddles or the like is arranged in the lower part of chamber 54 and an inlet 55 is provided at the base of the chamber for introducing air or inert gas for elutriating or effecting separation of finely divided catalyst particles from the inert heat transfer solids. The finely divided catalyst particles supported in the stream of elutriating gas pass into the upper part of chamber 54 and thence via line 56 into the upper part of regenerator vessel 40. Because of the decrease in gas velocity when this stream enters the regenerator vessel most of the catalyst particles drop back into the dense bed 43 while the elutriating gas mixes with the regeneration gases and stripping gases and passes therewith through cyclone separator 64 for separation of entrained catalyst and return thereof to the dense bed 43 through dip pipe 65 and discharge via line 66 to a flue, to heat or energy recovery equipment or to washing and/or storage equipment if it is desired to use this gas for stripping purposes.

Inert, heat transfer solids mixed with a small proportion of catalyst are discharged from the bottom of chamber 54 into standpipe 57. A small amount of nitrogen or other inert stripping gas is preferably introduced into the standpipe through line 58 to purge the inert solid particle-catalyst mixture of entrained or residual oxygen or carbon oxides. The solids are discharged from standpipe 57 through slide valve 59 into transfer line 60. A stream of recycle gas supplied to inlet line 61 serves to convey the hot inert solids and the small amount of catalyst admixed therewith through the transfer line 60 into the upper part of the reactor for discharge against baffle 62 and addition of said solids to the top of the dense bed in the reactor.

The feed or charging stock to the hydroforming reactor may be a virgin naphtha, a cracked naphtha, a Fischer-Tropsch naphtha or the like. The feed stock is preheated alone or in admixture with recycle gas to temperatures of from 500° to 1000° F. with the optimum range being about 600°–900° F. It is possible with the system shown to limit naphtha preheat to 600° F., obtainable by heat exchange with product streams and thus eliminate the necessity for a naphtha preheat furnace. The recycle gas, which contains from about 50 to 70 vol. percent hydrogen is preheated to temperatures of about 800°–1200° F., with temperatures below 1000° F. being preferable in order to obviate the use of alloy tubes in the preheat furnace. The recycle gas should be circulated through the reactor at a rate of from about 1000 to 8000, preferably about 1000–3000 cu. ft. per bbl. of naphtha feed.

The reactor system is charged with a mass of finely divided hydroforming catalyst particles. Suitable catalysts include Group VI metal oxides, such as molybdenum oxide, chromium oxide, or tungsten oxide, or mixtures thereof upon a carrier such as activated alumina, zinc aluminate spinel or the like. Preferred catalysts contain about 5 to 15 wt. percent molybdenum oxide or from about 10 to 40 wt. percent chromium oxide upon a suitable carrier. If desired minor amounts of stabilizers and promoters such as silica, calcium oxide, ceria or potassia can be included in the catalyst. The catalyst particles are, for the most part, between 300 and 400 mesh in size or about 0–100 microns in diameter with a major proportion between 20 and 80 microns.

The hydroforming reactor vessel should be operated at temperatures between about 850° and 925° F., preferably about 900° F. and at pressures between 50 and 500 lbs. per sq. inch. Temperatures above 900° F. result in increased carbon formation and lower selectivity to gasoline fractions while at temperatures below about 900° F. operating severity is low and would therefore require an excessively large reaction vessel. Lowering reactor pressure below 200 lbs. per sq. inch ordinarily results in increased carbon formation which becomes excessive below about 75 lbs. per sq. inch. Above 200 lbs., however, catalyst selectivity to light products ($C_4$'s) increases rapidly. The regenerator is operated at essentially the same pressure as the reactor vessel and at temperatures of about 1050°–1200° F.

The weight ratio of catalyst to oil introduced into the reactor should be about 0.1 to 5.0. It is preferred to operate at catalyst to oil ratios of about 0.3 to 1 since ratios above about 1 to 1.5 result in excessive carbon formation. Somewhat higher weight ratios can be used at higher pressures.

Space velocity or the weight in pounds of feed charged per hour per pound of catalyst in the reactor depends upon the age or activity level of the catalyst, the character of the feed stock and the desired octane number of the product. Space velocity for a molybdenum oxide on alumina gel catalyst may vary, for example, from about 1.5 wt./hr./wt. to about 0.15 wt./hr./wt.

The weight ratio of inert solids to catalyst circulated from the reactor dense bed 18 to the regenerator dense bed 43 may vary from about 1 to about 100 depending upon the relative amount of heat provided by the naphtha and recycle gas streams as compared to that supplied by the circulating inert solids. The temperature of the final reaction zone or section 19 in the reactor should be about 50 to 100° F. higher, preferably about 75° F. higher than the average temperature in main reactor bed 18.

The foregoing description contains a limited number of embodiments of the present invention. It will be understood that numerous variations are possible without departing from the scope of the following claims.

What is claimed is:

1. In the method of reforming hydrocarbons in contact with a mixture of finely divided reforming catalyst and inert heat transfer solids in a dense fluidized bed in which the catalyst particles and inert heat transfer solids are continuously circulated between a reaction and regeneration zone the improvement which comprises withdrawing a mixture of regenerated catalyst and inert heat transfer solids from the bottom of the regenerator dense bed, passing this mixture through an elutriation zone, separating a substantial part of the catalyst particles from said mixture and returning the separated catalyst particles to the regeneration zone, withdrawing a stream comprising a major proportion of hot, inert heat transfer solids from said elutriation zone, discharging said stream of hot, inert heat transfer solids into the upper part of the reaction zone and supplying vaporous reactants to the bottom of said reaction zone, thereby establishing at the upper part of said dense fluidized bed a zone of higher temperature than the average temperature in the main reactor bed in the reaction zone.

2. In the method of reforming hydrocarbons in contact with a mixture of finely divided reforming catalyst and inert heat transfer solids in a dense fluidized bed in which the catalyst particles and inert heat transfer solids are continuously circulated between a reaction and regeneration zone the improvement which comprises withdrawing a mixture of regenerated catalyst and inert heat transfer solids from the bottom of the regenerator dense bed, passing this mixture through an elutriation zone, separating a substantial part of the catalyst particles from said mixture and returning the separated catalyst particles to the regeneration zone, withdrawing a stream comprising a major proportion of hot, inert heat transfer solids from said elutriation zone, discharging said stream of hot inert heat transfer solids into the upper part of the reaction zone supplying vaporous reactants to the bottom of said reaction zone, thereby establishing at the upper part of said dense fluidized bed a zone of higher temperature than the average temperature in the main reactor bed in said reaction zone withdrawing a stream comprising a major proportion of regenerated catalyst particles from the regeneration zone and discharging the latter stream into the main reactor bed in the reaction zone.

3. In the method of reforming hydrocarbon fractions boiling within the naphtha range in contact with a mixture of finely divided reforming catalyst and inert heat transfer solids in a dense, fluidized bed in a reaction zone the improvement which comprises supplying vaporous reactants to the bottom of the dense fluidized bed withdrawing a stream of finely divided spent catalyst particles from the upper part of the dense fluidized bed, withdrawing a mixture of inert heat transfer solids and finely divided catalyst particles from the bottom of the dense fluidized bed, passing the latter mixture through an elutriation zone, separating a substantial part of the catalyst particles from said mixture and returning the separated catalyst particles to the reaction zone, withdrawing a stream of inert heat transfer solids from the elutriation zone, adding the inert heat transfer solids to a stream of regeneration gas, discharging the stream of spent catalyst particles into the mixture of inert solids and regeneration gas, discharging the resultant mixture into a regeneration zone, burning carbonaceous deposits from the solid particles in the regeneration zone in order to regenerate the catalyst particles and heat the inert solid particles, withdrawing a mixture of inert solids and regenerated catalyst particles from the bottom of the regenerator dense bed, passing this mixture through an elutriation zone, separating a substantial part of the catalyst particles from said mixture and returning the separated catalyst particles to the regeneration zone, withdrawing a stream comprising a major proportion of hot, inert heat transfer solids from said elutriation zone and discharging said stream of hot, inert heat transfer solids into the upper part of the reaction zone to establish therein a zone of higher temperature than the average temperature in the main reactor bed in the reaction zone.

4. In the method of reforming hydrocarbon fractions boiling within the naphtha range in contact with a mixture of finely divided reforming catalyst and inert heat transfer solids in a dense, fluidized bed in a reaction zone the improvement which comprises supplying vaporous reactants to the bottom of the dense fluidized bed withdrawing a stream of finely divided spent catalyst particles from the upper part of the dense fluidized bed, withdrawing a mixture of inert heat transfer solids and finely divided catalyst particles from the bottom of the dense fluidized bed, passing the latter mixture through an elutriation zone, separating a substantial part of the catalyst particles from said mixture and returning the separated catalyst particles to the reaction zone, withdrawing a stream of inert heat transfer solids from the elutriation zone, adding the inert heat transfer solids to a stream of regeneration gas, discharging the stream of spent catalyst particles into the mixture of inert solids and regeneration gas, discharging the resultant mixture into a regeneration zone, burning carbonaceous deposits from the solid particles in the regeneration zone in order to regenerate the catalyst particles and heat the inert solid particles, withdrawing a mixture of inert solids and regenerated catalyst particles from the bottom of the regenerator dense bed, passing this mixture through an elutriation zone, separating a substantial part of the catalyst particles from said mixture and returning the separated catalyst particles to the regeneration zone, withdrawing a stream comprising a major proportion of hot, inert heat transfer solids from said elutriation zone, discharging said stream of hot, inert, heat transfer solids into the upper part of the reaction zone to establish therein a zone of higher temperature than the average temperature in the main reactor bed in the reaction zone, withdrawing a stream comprising a major proportion of regenerated catalyst particles from the regeneration zone and discharging the latter stream into the main reactor bed in the reaction zone.

References Cited in the file of this patent

UNITED STATES PATENTS

| Number | Name | Date |
|---|---|---|
| 2,393,636 | Johnson | Jan. 29, 1946 |
| 2,400,176 | Thiele | May 14, 1946 |
| 2,446,247 | Scheineman | Aug. 3, 1948 |
| 2,455,915 | Borcherding | Dec. 14, 1948 |
| 2,483,485 | Barr | Oct. 4, 1949 |
| 2,532,613 | Dutcher | Dec. 5, 1950 |

FOREIGN PATENTS

| 118,399 | Australia | Apr. 27, 1944 |